United States Patent [19]

Inaba

[11] 4,191,382
[45] Mar. 4, 1980

[54] TURNTABLE ROTATION CONTROL DEVICE

[75] Inventor: Shizuo Inaba, Tokorozawa, Japan

[73] Assignee: Pioneer Electronic Corporation, Tokyo, Japan

[21] Appl. No.: 943,835

[22] Filed: Sep. 19, 1978

[30] Foreign Application Priority Data

Sep. 20, 1977 [JP] Japan ............................. 52-112937

[51] Int. Cl.² .......................................... G11B 17/06
[52] U.S. Cl. .................................. 274/15 R; 274/23 R
[58] Field of Search ............... 274/9 R, 9 RA, 13 R, 274/15 R, 23 R, 23 A

[56] References Cited

U.S. PATENT DOCUMENTS 4,049,279  9/1977  Kleis .................................. 274/15 R Primary Examiner—Harry N. Haroian
Attorney, Agent, or Firm—Sughrue, Rothwell, Mion, Zinn and Macpeak

[57] ABSTRACT

A turntable rotation control device has an electric motor reversibly rotatable. A mechanism is used for horizontally swinging a tone arm towards the inner circumference of a record by the rotation of the motor in a first direction. A second mechanism is employed for horizontally swinging the tone arm towards the outer circumference of the record by the rotation of the motor in a second direction. A first signal generating device generates a signal to rotate the motor in the first direction and a second signal generating device is employed for generating a signal to rotate the motor in the second direction a detecting circuit senses when the tone arm has been swung horizontally from the initial position at an arm rest and an OR gate circuit generates an output of a logical sum of an output signal of the first signal generating circuit and an output signal of said detecting circuit. A device circuit is driven by an output of said OR gate circuit to control the rotation of the turntable.

10 Claims, 7 Drawing Figures

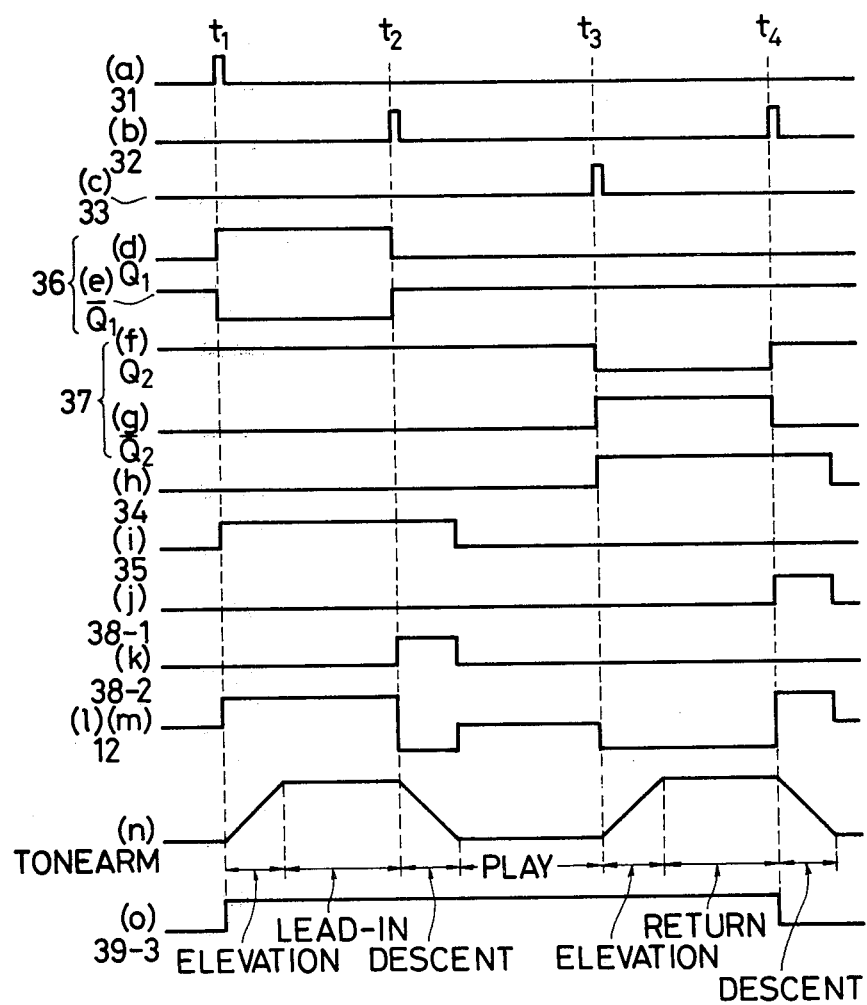

TURNTABLE ROTATION CONTROL DEVICE

BACKGROUND OF THE INVENTION

This invention relates to turntable rotation control devices, and more particularly to a turntable rotation control device in a record player with an automatic playback device.

In general, in a record player, the turntable on which a record is placed is rotated after the tone arm is horizontally swung towards the inner circumference of the record from the arm rest position. In this connection, no trouble is encountered if the record player is manually operated. However, difficulties in operation occur in the situation of a record player with an automatic playback device. In this type of record player, first, the tone arm is elevated by the elevation mechanism in response to the automatic playback start instruction. When the tone arm is elevated, it is not swung horizontally, and therefore the rotation of the turntable will not start. Accordingly, in some cases the user may have the impression that the player is out of order since operation is not initiated.

In some record players with automatic playback devices, the turntable is rotated during the operation of the playback device. These record players accordingly do not suffer from the above-described difficulty. However, in the record player of this type, the turntable is continuously rotated until the tone arm is lowered on the arm rest even if the tone arm has been returned to that arm rest position. This may be also mistaken for a failure of the player. Additionally, power consumption is increased since the motor is needlessly rotated. This is an additional difficulty accompanying the conventional player with an automatic playback device.

Accordingly, an object of this invention is to eliminate all of the above-described difficulties accompanying a conventional record player with an automatic playback device.

More specifically, an object of the invention is to provide a turntable rotation control device by which a turntable starts rotation simultaneously, when automatic playback is started, and the rotation of the turntable is stopped when the tone arm returns to the position at an arm rest after the playback is terminated.

These and other objects of this invention are accomplished using a turntable rotation control device having a reversible electric motor. A mechanism is used for horizontally swinging a tone arm towards the inner circumference of a record by the rotation of the motor in a first direction. A second mechanism is employed for horizontally swinging the tone arm towards the outer circumference of the record by rotation of the motor in a second direction.

First and second signal generating devices are employed to reversibly drive the motor. A detecting circuit senses when the tone arm has been swung horizontally from an initial position at an arm rest and an OR gate circuit generates an output comprising the logical sum of output signals of the first signal detecting circuit and the detecting circuit. A drive circuit, controlled by OR gate output is used to control rotation of the turntable.

These aspects of the invention will become apparent from the drawings and the description of the preferred embodiment which follow.

BRIEF DESCRIPTION OF THE DRAWINGS

FIG. 5 is a waveform diagram for a description of the operation of the circuit shown in FIG. 1.

DESCRIPTION OF THE PREFERRED EMBODIMENT

Figure 1:
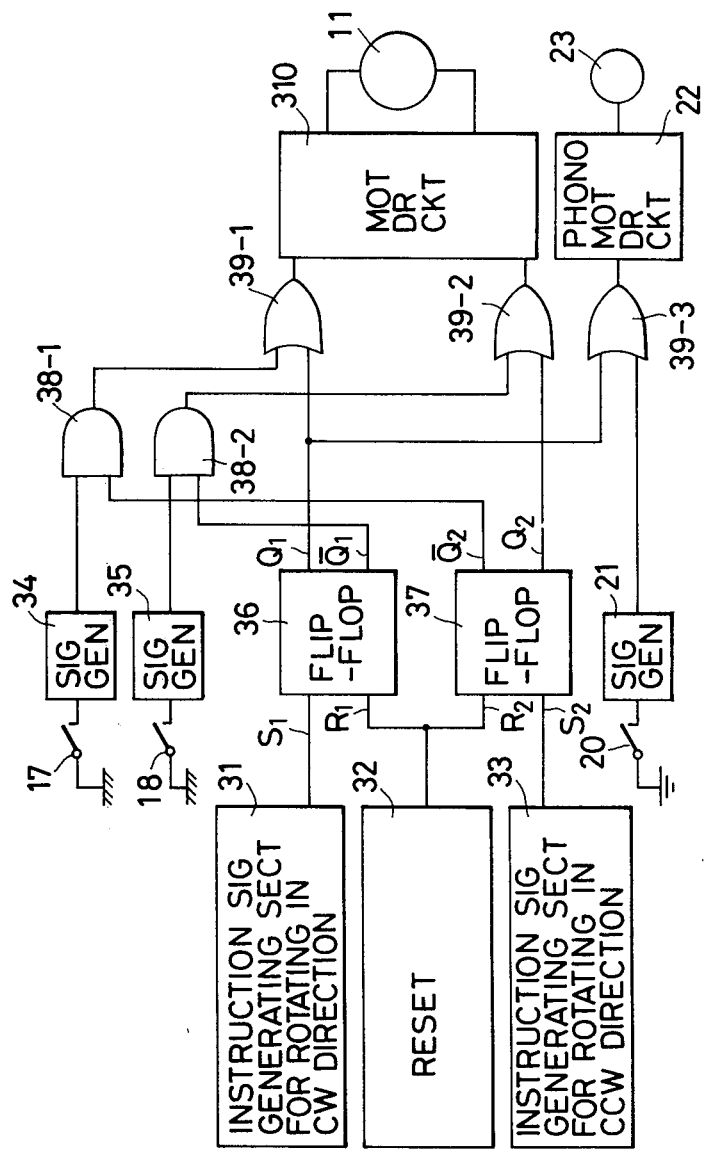
FIG. 1 is a block diagram showing one embodiment of this invention.

Referring now to FIG. 1, an electric motor 11 is employed to drive a tone arm elevating, lowering and horizontally swinging mechanism. The motor 11 is a reversible motor which can rotate in both the clockwise and counterclockwise directions according to the output of a driving circuit 310. A signal generating section 31 operates to generate a signal for rotating the motor clockwise, and it generates the instruction signal at the time a record is be played to set a flip-flop circuit 36.

The set output $Q_1$ of this flip-flop circuit 36 is applied to one of the input terminals of a two-input OR gate 39-1. A signal generating section 33 operates to provide a signal for rotating the motor counterclockwise. It provides the instruction signal when the playing of a record is complete or suspended before the end of the record to set a flip-flop circuit 37. The output $Q_2$ of this flip-flop circuit 37 is applied to one of the input terminals of a two-input OR circuit 39-2.

A reset signal generating circuit 32 operates to generate a signal for resetting the flip-flop circuits 36 and 37. The reset signal is generated when the tone arm reaches the playback start point of a record or when the tone arm reaches the arm rest after completing the playback of a record.

Figure 2:
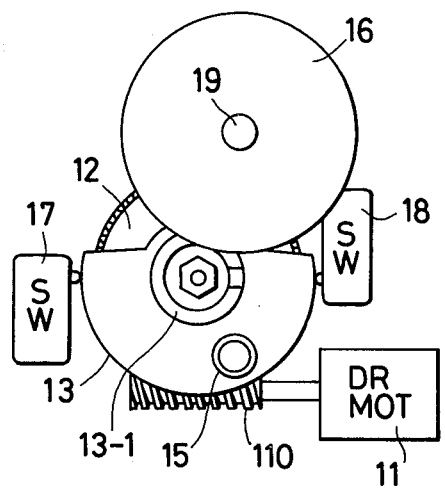
FIGS. 2 and 3 are a front view and a side view showing a tone arm drive mechanism, respectively.

A switch 18 and a signal generating circuit 35 which generates a signal when the switch is open are provided as first means for detecting the position of a cam 13 (FIG. 2). The output signal of the signal generating circuit 35 and the output signal $\overline{Q_1}$ of the flip-flop circuit 36, opposite in polarity to its set output $Q_1$, are applied to AND gate 38-2, the output of AND gate 38-2 is in turn applied to the other input terminal of the OR gate 39-2. The output of the OR gate 39-2 is applied to the driving circuit 310 to provide a signal for rotating the motor counterclockwise.

A switch 17 and a signal generating circuit 34 which generates a signal when the switch 17 is open are provided as second means for detecting the position of the cam 13. The output signal of the circuit 34 and the output signal $\overline{Q_2}$ of the flip-flop circuit 37, opposite in polarity to its set output $Q_2$, are applied to AND gate 38-1. The output of AND gate 38-1 is applied to the other input terminal of the OR gate 39-1. The output of the OR gate 39-1 is applied to the driving circuit 310 to provide a signal for rotating the motor clockwise.

A switch 20 and a signal generating circuit 21 which outputs a signal when the switch 20 is open are provided as a means for detecting when the tone arm is horizontally swung from the arm rest. The output signal of the circuit 21 and the set output signal $Q_1$ of the flip-flop circuit 36 are applied to an OR circuit 39-3. The output of OR circuit 39-3 is employed to rotate the phono motor (and accordingly the turntable) 23 through a phone drive circuit 22.

Figure 3:
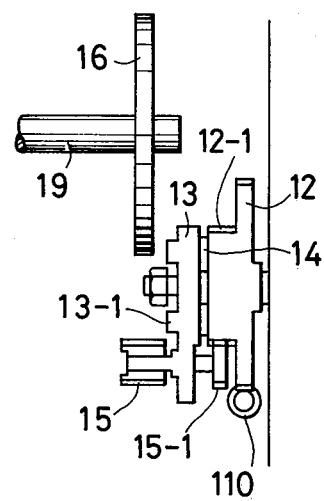

FIGS. 2 and 3 show a drive mechanism in a tone arm drive device employed in this invention. More specifically, FIG. 2 and FIG. 3 are plan and sectional views showing the drive mechanism. Referring now to those figures, rotation of the motor 11 is transmitted through a power transmitting mechanism 110 to a semi-circular cam 12. This semi-circular cam 12 is coupled through a friction coupling member 14 to a second semicircular cam 13 so that rotation of the first cam 12 is transmitted to the second cam 13.

A rotatable roller 15 is provided on the surface of the cam 13 at the position shown in FIGS. 2 and 3. The roller 15 has a gear section 15-1 engaging a gear section 12-1 of the cam 12. Therefore, the roller 15 will rotate and revolve in correspondence to cam 12 rotation. A mechanism (not shown) for vertically moving the tone arm is engaged with the cam surface 13-1 of the cam 13, so that the tone arm is elevated or lowered according to the rotation of the cam 13. A disk-shaped rotary drive board 16 is provided around an arm rotating shaft 19 as shown in FIGS. 2 and 3.

The switches 17 and 18 adapted to detect the position of the cam 13 are provided as shown in FIGS. 2 and 3. More specifically, the switches 17 and 18 are so disposed that when no record is being played, they are opened by both end portions of the circumferential wall of the semi-circular cam 13, respectively.

Figure 4A:
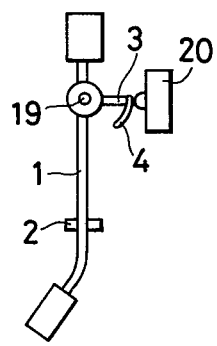
FIG. 4 shows a positional relation between a tone arm and a switch, more specifically, the parts (a) and (b) of FIG. 4 are plan and side views showing the position relation.
Figure 4B:
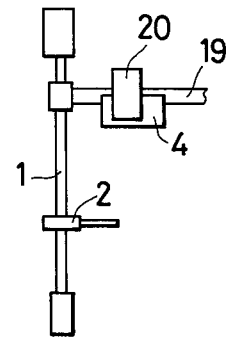

FIG. 4 shows the positional relation between the tone arm and the switch 20. More specifically, FIGS. 4(a) and (b) are plan and side views respectively showing the relationship between the elements. The tone arm 1 is horizontally supported on the arm shaft 19 for swinging motion thereabout. An operating member 3 extends radially from the arm shaft 19, and has a protrusion 4 at its end. The protrusion extends, as shown in the direction of rotation and in the clockwise direction. The protrusion 4 therefore has a substantially-arc-shaped surface extending in the direction of arm rotation. When the tone arm is on the arm rest 2, the upper right end portion of the protrusion 4 presses against the switch 20 to close the latter. The protrusion 4 is designed to that even when the tone arm is elevated, it abuts against the switch 20 if the tone arm is not swung horizontally.

The operation of the turntable rotation control device will be described with reference to a timing waveform diagram shown in FIG. 5. In FIG. 5 line (a) shows the output of the set signal generating circuit 31 and line (b), the output of the reset signal generating circuit 32. The third wave form (c), the output of the set signal generating circuit 33, and lines (d) and (e) show the outputs $Q_1$ and $\bar{Q}_1$ of the flip-flop circuit 36, respectively. Lines (f) and (g) show the outputs $\bar{Q}_2$ and $Q_2$ of the flip-flop circuit 37, respectively. The waveform (h) is the output of the signal generating circuit 34 and (i) is the output of the signal generating circuit 35. The output of the AND gate 38-1 is shown on line (j) and (k), shows the output of the AND gate 38-2. Lines (l) and (m) show the clockwise and counterclockwise rotations of the cam 12 and the line (n), the operation of the tone arm. Finally, line (o) shows the output of the OR gate 39-3.

When the power switch is turned on, an initial reset signal is provided by the reset signal generating circuit 32. It is assumed that in such a mode of operation the tone arm drive mechanism is positioned as shown in FIG. 2. Then, prior to time instant $t_1$, all the output waveforms are as shown in FIG. 5. At the time instant $t_1$, the set signal generating circuit 31 generates an output set signal with a suitable means adapted to instruct the start of playback, thereby to set the flip-flop circuit 36. As a result, the outputs $Q_1$ and $\bar{Q}_1$ have a high level and a low level, respectively. Hereinafter, the high level and the low level will be designated by "H" and "L", respectively, when applicable. The set output $Q_1$ at "H" is applied through the OR gate 39-1 to the drive circuit 310 to rotate the motor 11 clockwise. The rotation of the motor 11 is transmitted through the power transmitting mechanism 110 to the cam 12 to rotate the latter 12 clockwise. The rotation of the cam 12 is transmitted through the friction coupling member 14 to the cam 13 to rotate the latter 13 clockwise.

As the cam 13 is rotated, the switch 18 is opened and the signal generating circuit 35 generates the "H" output; however, no output is provided by the AND gate 38-2 because the $\bar{Q}_1$ output of the flip-flop circuit 36 is at "L". The cam 13 is rotated clockwise continuously, and the tone arm is elevated by the cam surface 13-1. In this case, since the Q output of the flip-flop circuit 36 is at "H", the output of the OR gate 39-3 is raised to "H". Therefore, the phono motor driving circuit is driven to rotate the phono motor 23 and accordingly the turntable.

As the cam 13 is further turned, the roller 15 is engaged with the drive board 16 of the cam shaft 19, whereupon the rotation of the cam 13 is stopped. However, since the cam 12 is rotating clockwise, the roller 15 will rotate through the gear section 12-1 provided on the cam 12. The drive board 16 is rotated clockwise by the rotation of the roller and as a result the tone arm is swung towards the record. With the aid of a suitable means for detecting the descent position, the reset signal generating circuit 32 provides a reset signal at the time instant $t_2$, thereby to reset the flip-flop circuit 36. As a result, the outputs $Q_1$ and $\bar{Q}_1$ of the flip-flop circuit 36 are at "L" and "H", respectively. As the output $Q_1$ is at "L", the clockwise rotation is stopped. On the other hand, because the previous output of the signal generating circuit 35 and the output $\bar{Q}_1$ of the flip-flop circuit 36 are both at "H", the output of the AND gate 38-2 is raised to "H".

The "H" output of the AND gate 38-2 is applied through the OR gate 39-2 to the drive circuit 310 to rotate the motor in the opposite direction, and therefore the cams 12 and 13 are rotated counterclockwise. Accordingly, the tone arm will descend by the action of cam surface 13-1. Since the cam 13 is restored as shown in FIG. 2, the switch 18 is closed and the output of the signal generating circuit 35 is lowered to "L". As a result, the rotation of the motor 11 is stopped and the playback state is obtained.

In this case, alghough the $Q_1$ output of the flip-flop circuit 36 is at "L", the tone arm is in a state that it is swung from the arm rest. Therefore, the switch 20 is disengaged from the protrusion 4 of the operating member 3, that is, the switch 20 is open, and accordingly, the "H" output is provided by the signal generating circuit 21. Thus, the output of the OR gate 39-3 is at "H", and the phono motor and the turntable are rotating.

The operation of the control device when playing of a record is completed or is suspended before the end will now be described. With the aid of a suitable sensor for detecting the record playback completion or a suitable means for suspending the playback, the set signal generating circuit 33 generates a set signal at the time instant t₃, to set the flip-flop circuit 37. As a result, the outputs $Q_2$ and $\bar{Q}_2$ of the flip-flop circuit 37 are at "H" and "L", respectively. The output $Q_2$ at "H" is applied through the OR gate 39-2 to the drive circuit 310 to rotate the motor 11. The rotation of the motor 11 is transmitted through the power transmission mechanism 110 to the cam 12 to rotate the latter 12 counterclockwise. The rotation of the cam 12 is transmitted through the friction coupling member 14 to the cam 13 to rotate the latter 13 counterclockwise. In this operation, the switch 17 is opened and the signal generating circuit 34 outputs the "H" signal; however, no output is provided by the AND gate 38-1 because the output $\bar{Q}_2$ is at "L".

As the cam 13 is rotated, the tone arm is elevated by the cam surface 13-1. With the cam 13 further rotating, the roller 15 abuts against the drive board 16 of the arm shaft 19. Therefore, the rotation of the cam 13 is stopped. However, the cam 12 will continue to rotate, and therefore the roller 15 continues its rotation through the gear section 12-1 of the cam 12. By this rotation of the roller 15, the drive board 16 is rotated counterclockwise, and therefore the tone arm is swung towards the outer circumference of the record. With the aid of a suitable sensor for detecting the arrival of the tone arm at the arm rest, the reset signal generating circuit 32 provides a reset signal at the time instant t₄.

Although the tone arm is at the elevation position, it reaches the arm rest as viewed from above. Therefore, the protrusion 4 of the operating member 3 engages the switch 20 to close the latter 20. Accordingly, the output of the signal generating circuit 21 is at "L". On the other hand, as the $Q_1$ output of the flip-flop circuit 36 is at "L" also, the output of the OR gate 39-3 is lowered to "L". As a result, the rotation of the turntable is stopped.

With the reset signal of the reset signal generating circuit 32, the flip-flop circuit 37 is reset, and its outputs $Q_2$ and $\bar{Q}_2$ have "L" and "H", respectively. The "H" output of the signal generating circuit 34 and the output $\bar{Q}_2$ at "H" are applied to the AND gate 38-1, and therefore the output of the AND gate 38-1 is raised to "H". This "H" output of the AND gate 38-1 is applied through the OR gate 39-1 to the drive circuit 310 to rotate the motor 11 in the opposite direction, whereby the cams 12 and 13 are rotated clockwise. The tone arm will descend by the action of cam surface 13-1. When the cam 13 is restored as shown in FIG. 2, the switch 17 is closed and the output of the signal generating circuit 34 is changed to "L" to stop the rotation of the motor 11.

Figure 6:
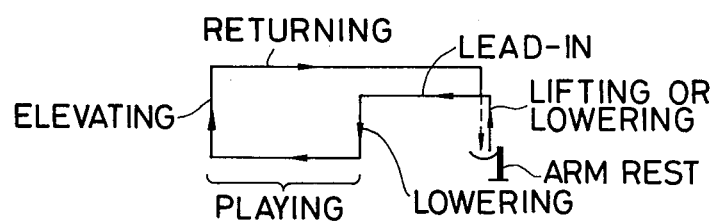
FIG. 6 is a diagram showing a relation between the operation of the tone arm and the rotation of a turntable.

Accordingly, as indicated in FIG. 6, the turntable is rotated simultaneously when the arm is elevated at the time of starting the playback of the record and the rotation of the turntable is stopped when the tone arm returns to the arm rest and is immediately above the rest arm after the playback completion. The turntable is also stopped before the tone arm is lowered onto the arm reset. In FIG. 6, the solid line indicates the rotation of the turn table, and the dotted line indicates when the turn table is stopped.

As is apparent from the above description, according to the invention, in the record player with the automatic playback device, as soon as the tone arm is elevated upon instruction of the playback start, the turntable will begin to rotate, and the rotation of the turntable is stopped simultaneously when the tone arm is returned to the arm rest. Therefore, in this mode of operation the operator has positive knowledge that the operation of the turntable is satisfactory and additionally, useless rotation is eliminated.

It is apparent that variations of this invention are possible without separating from the scope of this invention.

I claim:

1. In a record player having a turntable, a turntable drive motor for rotating said turntable, a tone arm and a rest for the tone arm, the improvement comprising:
   a reversible electric motor,
   first means for horizontally swinging a tone arm towards the inner circumference of a record mounted on said turntable by rotation of said motor in a first direction;
   second means for horizontally swinging said tone arm toward the outer circumference of a record mounted on said turntable by rotation of said motor in a second direction;
   means for generating signals to effectuate rotation of said motor in said first and second directions,
   means for detecting when said tone arm has been swung horizontally from an initial position on said rest and generating an output signal thereof,
   circuit means for producing a logical sum of an output signal of said signal generating means to drive said motor in said first direction and an output signal of said detecting means; and
   a drive circuit driven in response to the logical sum output of said circuit means to control rotation of the turntable.

2. The device of claim 1 wherein said means for detecting comprises a switch activated when said tone arm is horizontally swung from a position at rest, and a signal generating circuit controlled by said switch to generate a signal to said drive circuit when said tone arm is swung horizontally.

3. The apparatus of claim 1 wherein said circuit means comprises and OR gate, and wherein said drive circuit actuates said turntable motor in response to the output of said OR gate.

4. The apparatus of claim 1 wherein said means for generating signals comprises a first signal generating section to effectuate rotation of said reversible electric motor in a first direction and a second signal generating section to effectuate rotation of said reversible electric motor in a second direction.

5. The apparatus of claim 4 wherein said first means for horizontally swinging said tone arm comprises, first switch means responsive to rotation of said reversible electric motor in a first direction, a first signal generator responsive to said first switch means and producing an output when said tone arm reaches a first predetermined position, and first logic means responsive to the output of said first signal generator and said first and second generating sections to drive said reversible electric motor in said first direction.

6. The apparatus of claim 1 wherein said first logic means comprises an AND circuit receiving the outputs of said first signal generator and said second signal generating section and producing an output signal, and an OR gate receiving the output of said AND gate and the output of said first signal generating section.

7. The apparatus of claims 4, 5 or 6, wherein said second means for horizontally swinging said tone arm comprises second switch means responsive to the rotation of said reversible electric motor in a second direction, a second signal generator responsive to said second switch means and producing an output when said tone arm reaches a second predetermined position, and second logic means responsive to the output of said second signal generator and said first and second generating sections to drive said reversible electric motor is said second direction.

8. The apparatus of claim 7 wherein said second logic means comprises an AND gate receiving the outputs of said second signal generator and said first signal generating section and producing an output signal, and an OR gate receiving the output of said AND gate and the output of said second signal generating section.

9. The apparatus of claim 1 further comprising cam means movable in response to rotation of said reversible motor for vertically moving said tone arm.

10. The apparatus of claim 1 wherein said tone arm is supported for horizontal rotation on a shaft, said tone arm having a protrusion extending outward therefrom in the direction of arm rotation whereby, when said tone arm is at rest or elevated said protrusion abuts said means for detecting horizontal movement.

* * * * *